United States Patent [19]

Leiber

[11] Patent Number: 4,919,493
[45] Date of Patent: Apr. 24, 1990

[54] METHOD AND APPARATUS FOR CONTROLLING BRAKE PRESSURE IN VEHICLE BRAKE SYSTEMS

[76] Inventor: Heinz Leiber, Theodor-Heuss Str. 34, D-7141 Oberriexingen, Fed. Rep. of Germany

[21] Appl. No.: 196,843

[22] Filed: May 13, 1988

Related U.S. Application Data

[63] Continuation of Ser. No. 828,791, Feb. 12, 1986, abandoned.

[30] Foreign Application Priority Data

Mar. 29, 1985 [DE] Fed. Rep. of Germany ....... 3511579

[51] Int. Cl.$^5$ .................................................. B60T 8/00
[52] U.S. Cl. .................. 303/15; 303/DIG. 3; 303/114; 303/119
[58] Field of Search .................. 303/92, 100, 114, 116, 303/13, DIG. 3, DIG. 4, 15, 20; 188/181 C

[56] References Cited

U.S. PATENT DOCUMENTS

| | | | |
|---|---|---|---|
| 3,929,380 | 12/1975 | Leiber | 303/DIG. 4 |
| 4,231,620 | 11/1980 | Leiber | 303/119 |
| 4,428,620 | 1/1984 | Warwick et al. | 303/DIG. 4 |
| 4,462,642 | 7/1984 | Leiber | 303/116 |
| 4,478,461 | 10/1984 | Leiber | 303/92 |
| 4,550,954 | 11/1985 | Leiber | 303/DIG. 4 |
| 4,589,706 | 5/1986 | Leiber | 303/114 |

FOREIGN PATENT DOCUMENTS 3324496 1/1985 Fed. Rep. of Germany ...... 303/114
3329706 3/1985 Fed. Rep. of Germany ...... 303/114

Primary Examiner—David K. Moore
Assistant Examiner—Alvin Oberley
Attorney, Agent, or Firm—Edwin E. Greigg

[57] ABSTRACT

A method and apparatus for controlling brake pressure having a brake booster and a pedal-actuated brake valve, in order to effect parallel feeding of the pressure medium fed via the brake valve into a primary main booster chamber. A feed valve is arranged such that displacement volumes in the wheel brake cylinders, in particular, are equalized by means of direct pressure feeding. The triggering of the feed valve is effected based on the result of comparison of travel or pressure variables detected by transducers in the vicinity of the master brake cylinder.

18 Claims, 2 Drawing Sheets

METHOD AND APPARATUS FOR CONTROLLING BRAKE PRESSURE IN VEHICLE BRAKE SYSTEMS

This is a continuation of copending application Ser. No. 828,791 filed Feb. 12, 1986, abandoned.

BACKGROUND OF THE INVENTION

The invention is based on a method and an apparatus for controlling brake pressure in vehicle brake systems.

Known vehicle brake systems (German Offenlegungsschrift 32 37 959) have a tandem master cylinder with master pistons disposed in it, which are displaced, for instance via a booster, by means of a pedal via a tappet in order to generate brake pressure; two brake circuits are provided, and valves built into the circuits are respectively associated with one or two wheel brakes, so that if the danger of skidding or locking of an associated braked wheel arises, it is also possible to shift the pistons out of the normal position into a position for brake reduction. This known vehicle brake system operates on the principle of feeding pressure directly from the pressure producing unit, and to attain the anti-skid function, also known as ABS for anti-skid braking, the applicable branch of the brake circuit that is located between the wheel brake and the valve is temporarily opened, so that pressure medium flows out of the brake circuit and the brake pressure drops in the desired manner. If the danger of skidding is past, then the removed pressure medium is replaced by feeding in a pressure medium that is kept maintained, under pressure, by a pressure supply unit. This known vehicle brake system requires a complicated electronic monitoring unit, which prevents the valves from being moved into their pressure reduction position if the pressure supply should fail while in the anti-skid mode.

In another hydraulic brake booster system (German Offenlegungsschrift 28 25 087), equipped with an integrated anti-skid apparatus, the brake booster has a dual function, namely brake boosting and pressure modulation for the anti-skid mode. For this pressure modulation, a particular valve switching arrangement is used in combination with a specialized brake booster design, in which the master cylinder of the brake booster is used for pressure modulation. Generally, two different types of brake boosters are known in the prior art, differing in the principle by which they operate: those operating with a so-called travel simulator, which generates a predetermined feedback force upon the brake pedal (action of the travel simulator spring), and those lacking a travel simulator, in which the pedal characteristic is defined by the volumetric capacity of the brake system (German Offenlegungsschrift 33 19 465). Brake boosters that are used in a brake system having disk brakes inherently have a good pedal characteristic; in brake systems with drum brakes, however, the pedal characteristic is less favorable, because a larger volumetric quantity of pressure medium is initially required to cause contact of the brake surfaces, and this dictates a corresponding pedal travel of the brake pedal.

OBJECT AND SUMMARY OF THE INVENTION

It is therefore an object of the present invention to bring about an ideal pedal characteristic in a hydraulic brake booster in the low pressure ranges or in partial braking, so that with the least possible expense the required displacement volume can be compensated for and assured and that whether the brake system has disk brakes, drum brakes with restoring mechanisms and/or both combined, the brake system will be moved into full readiness for braking with relatively small actuating forces on the brake pedal and with relatively little pedal travel.

This object is attained in accordance with the invention with the advantage that virtually before the master cylinder pistons that are responsible for the individual (closed) brake circuits respond by being mechanically displaced, the pressure feeding is modified in accordance with the present invention into the connected brake circuits. The displacement volume required for instance for the brake surfaces to be in contact or for overcoming the idle travel is supplied to these brake circuits, or to the wheel brakes, resulting in an effective correction of the pedal characteristic in the low-pressure range which causes a shift of the pedal characteristic curve in the direction of shorter pedal travel or lower booster pressures, in order to attain the same initial pressures in the brake circuits or shorter master brake cylinder piston movements may be required for a specific brake pressure. The result is not only greater safety, because there is some free displacement travel available, but also the opportunity to attain a desired pedal characteristic by taking measures to correct the characteristic curves.

A further advantage is that direct pressure feeding via a feed valve suitably triggered by electrical signals can be restricted to a brief initial feeding period, so that the correction range in the known pedal travel over initial brake pressure (or primary triggered booster pressure over the travel of the master brake cylinder piston or pistons, or arbitrary combinations thereof) can be prespecified in a desired manner.

Especially in the case of brake boosters combined or integrated with ABS systems, the sensors that are necessary for detecting the electrical signals required for triggering the feeding valve are already present, namely in the form of travel or pressure transducers, so that the improvement of pedal characteristic achieved with the invention is attainable at the lowest possible cost.

A further advantage is that it is possible to realize the invention in combination with time-tested conventional brake boosters; the correction of the pedal characteristic simultaneously makes it possible, in relatively low pressure ranges, to use master cylinders having smaller diameters. This is also advantageous in the event of a pressure supply failure, because by this provision, higher brake pressures are attainable with the same pedal force (a so-called translation jump).

The use of pressure and travel transducers in combination with comparators for processing the electrical signals not only enables desired characteristic curves to be specified in certain ranges, but also makes it possible to detect malfunctions or pressure feeding failure, to recognize brake circuit failure, and so forth; this can be indicated by warning devices, and it also becomes possible to block pressure feeding.

The invention will be better understood and further objects and advantages thereof will become more apparent from the ensuing detailed description of a preferred embodiment taken in conjunction with the drawings.

DESCRIPTION OF THE PREFERRED EMBODIMENTS

The basic concept of the present invention is to apply the principle of direct pressure feeding, modified in order to overcome displacement volumes in the brake circuits, resulting in an idealized pedal characteristic. By using travel transducers or pressure sensors, electrical signals are obtained and when appropriately processed contribute in an intended manner to trigger the pressure feed valve.

Figure 1:
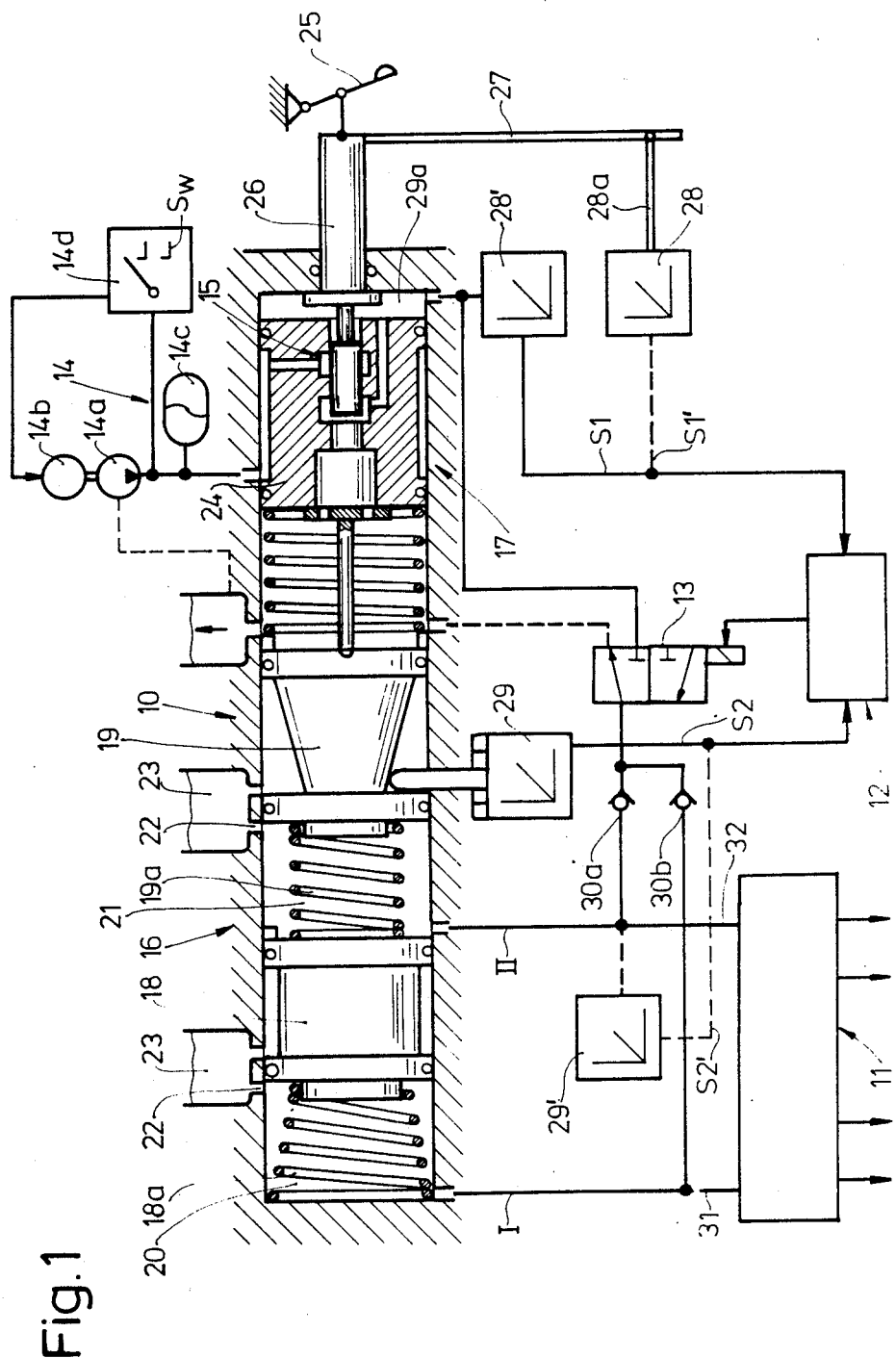
FIG. 1 shows a first exemplary embodiment of a hydraulic brake booster with an associated ABS valve block and means for initial pressure feeding in order to affect the pedal characteristic.

The exemplary embodiment of a vehicle brake system shown in FIG. 1, illustrates means for feeding pressure in order to effect a correction of the pedal characteristic, especially in the range of relatively low pressures or in the partial braking range. Three main components are provided: a brake booster 10 which is to be understood merely as an example; a valve block 11 for realizing ABS functions; and an electronic logic circuit 12 with associated transducers or sensors, which detect travel or pressure values in the vicinity of the brake booster 10 and deliver them in the form of electrical signals to the logic circuit 12. The logic circuit serves to trigger a feed valve 13 for feeding pressure to the brake circuits I, II. The illustration in FIG. 1 also includes a pressure generating or supply apparatus 14, comprising a pump 14a, an electric motor 14b driving the pump, a pressure reservoir 14c and a pressure switch device 14d.

The ABS valve block 11 includes the valves needed for realizing ABS functions, which typically are mainly maintenance functions; these valves are not shown individually, because in this sense they are not the subject of the present invention, valves such as shown in U.S. Pat. No. 4,550,954 may be used. Especially in the so-called integrated ABS systems, in which the brake booster 10 has a dual function including both brake boosting and pressure modulation for the ABS function, communication may extend from the pressure supply via special valves in the ABS valve block 11 and only then to the brake valve 15 in the brake booster 10, which is not shown separately.

The brake booster shown in FIG. 1 is to be considered solely as an example, limiting neither the invention nor the scope of the invention. The brake booster 10 may have the design shown here or any other, even a conventional, design, and is then used in combination with the components that realize the invention.

The brake booster 10 shown in FIG. 1 has a tandem master cylinder 16 and an adjusting cylinder zone 17 that represents the booster portion. In a main cylinder bore, which in this case is not stepped, the tandem master cylinder 16 has a first master piston 18 with an associated compression spring 18a and a second master piston 19 with an associated compression spring 19a, which is supported on the first master piston 18. The compression springs 18a and 19a force the two master pistons 18 and 19 into their initial position, shown in FIG. 1. In these initial positions, the respective pressure chambers 20 and 21 of the master pistons 18 and 19 communicate via expansion ports 22 with one or more supply containers 23 of pressure medium.

In the exemplary embodiment of a brake booster 10 which lacks a travel simulator, as shown in FIG. 1, the booster piston 24 in the booster portion 17 surrounds the control or brake valve 15 annularly, so that this valve 15 and the booster piston 24 are located in the longitudinal axis of the tandem master cylinder. The brake valve 15 is actuatable by the brake pedal 25 via intermediate linking means and via a pressure rod 26 in a manner known per se; the pressure rod 26, may also be a pressure plate with a pressure tappet affixed to it. A cross rod or cross plate 27 is secured to the pressure rod 26 for transmitting the pedal motion which actuates a sensor tappet 28a of a first travel transducer 28 for detecting the pedal travel. Instead of or in addition to the travel transducer 28, which generates an output signal S1', a pressure transducer 28' may also be provided, which detects the booster pressure fed via the brake valve 15 into the booster pressure chamber 29a on the primary side of the booster piston 24 and generates an electrical signal S1. The electrical signals S1 and/or S1' are directed to the electronic logic circuit 12.

Further sensors are provided, such as a travel transducer 29, which detects the piston travel of the master brake cylinder piston 19 and emits a corresponding electrical output signal S2, and alternatively or in addition to the travel transducer 29, a pressure transducer 29', which in this case is connected to detect the output pressure in the brake circuit II and to generate a corresponding electrical output signal S2'. The output signals of the pressure and/or travel transducers 28', 29', 28 and 29 are delivered to the electronic logic circuit 12 and serve to trigger the feed valve 13 in order to supply fluid from pressure chamber 29a via feed valve 13 to the brake circuits I and II via one-way valves 30a and 30b.

The feed valve 13 is a 3/2-way valve and in one position—in the triggered state—it connects the pressure line from booster pressure chamber 29a on the primary side of the booster piston directly, via intermediate check valves 30a, 30b, with the two pressure lines 31 and 32 of the brake circuits I and II with the connections between the output connections of the pressure chambers 20 and 21 of the brake booster 10 and the ABS valve block 11. In the non-triggered position of the feed valve 13, the supply of booster pressure medium from pressure chamber 29a is blocked, and the feed valve 13 communicates with the return flow line, shown in dotted lines. The pressure in brake circuits I and II is not fed back through the return flow line because of the one-way valves 30a and 30b.

The remaining structure, in particular as it relates to the electronic logic circuit, will be described below in connection with the description of the mode of operation of the invention.

MODE OF OPERATION

Upon actuation of the brake pedal 25, the brake valve 15 opens the communication with the pressure medium supply 14; pressure medium flows through the brake valve 15 and reaches the primary pressure chamber 29a in order to act upon the booster piston 24, which functions to move the respective master brake cylinder pistons 18 and 19 far enough that an equilibrium is attained between the pedal force and the pressure counteracting the pedal pressure. The movement of the pedal tappet 28a is sensed by the travel transducer 28, or alternatively or in addition by the pressure transducer 28' that detects the booster pressure which movement is converted into a corresponding electrical output signal S1 or S1' and delivered to the logic circuit 12. Correspondingly, the piston travel sensed by the travel transducer 29, or alternatively the output pressure sensed by the pressure transducer 29', is detected, converted into electrical output signals S2 or S2', and delivered to the logic circuit 12 for comparison purposes. If the signals from transducers 28' or 28 differs from the signals from transducers 29 or 29', the feed valve 13 will be triggered and pressure fluid will be directed to brake circuits I and II.

Figure 2:
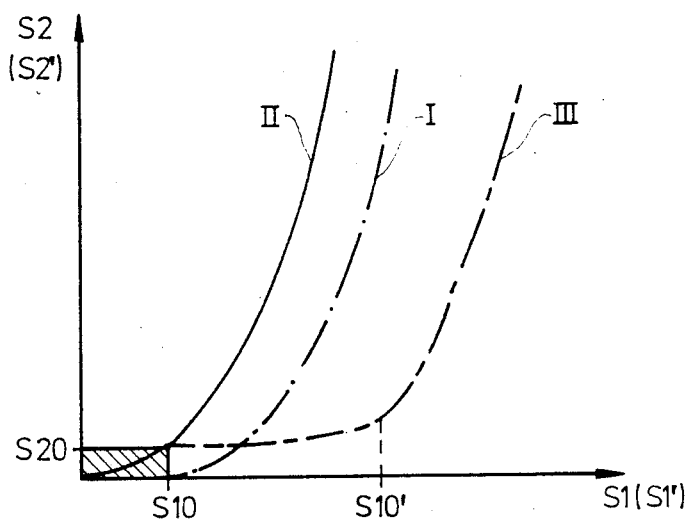
FIG. 2, is a diagram which shows various characteristic curve courses relating to the pedal characteristic.
Figure 3:
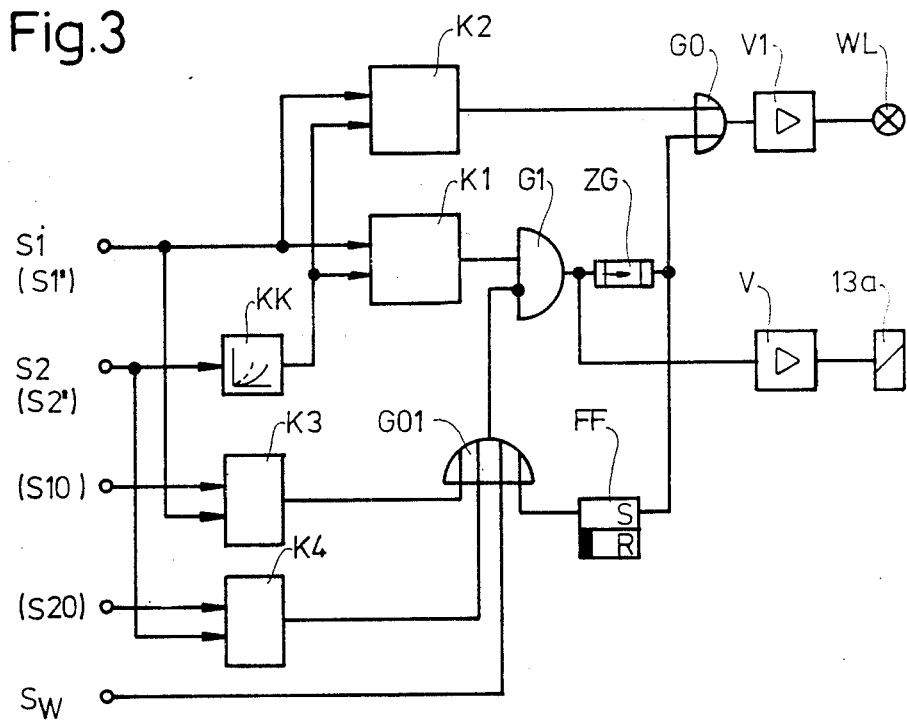
FIG. 3 shows an electrical or electronic logic circuit for triggering the feed valve.

As shown in FIG. 3, the electronic logic circuit includes a first main comparator K1, which compares the two different electrical signals delivered to it with each other, that is, either the fed-in booster pressure S1 or the pedal travel S1' on the one hand and the piston travel S2 or output pressure S2' on the other, the latter signals may be delivered via a characteristic curve correction circuit KK, and if the signal levels are different responds and triggers the magnetic portion 13a of the feed valve 13 via an AND gate G1 connected to the output side of the logic circuit and via an electrical amplifier V. As a result, the pressure medium fed into the booster chamber 29a is fed into both brake circuits I, II via the 3/2 way valve 13. This is the basic function, which can be modified and varied in many ways. Initially, by means of the characteristic curve correction circuit KK, which may for instance include a characteristic curve generator known per se, converstion of the electrical input signal that is delivered can set forth a desired pedal characteristic, which is then correspondingly expressed in the course of the characteristic curve shown in FIG. 2, which will now be described.

In principle, it is also basically possible to realize the pressure feeding, and the characteristic curve correction that is attainable therewith, over the entire range of the diagram of FIG. 2; preferably, however, the pressure feeding is performed only in an initial correction range, indicated in FIG. 2 by dashed lines, and only for a predetermined, relatively brief onset time, within which the pressure feeding by the feed valve 13 should be completed, so that very little pressure medium needs to be supplied for purposes of correcting the characteristic curve. In FIG. 3, the timing element, which makes a connection after a predetermined delay period if the output signal of the AND gate G1 is still present, is labelled ZG. A multivibrator, for instance a bistable multivibrator FF acting as an error memory and which serves to block the time overrun recognition means, is set by the output of the timing element ZG, which can also trigger a warning lamp WL, via a branch line and via an OR gate GO and an interposed amplifier V1.

The output of the error memory FF is connected to a further OR gate GO1, the output of which basically blocks the AND gate G1 that transmits the output signal of the main comparator K1.

Therefore, this OR gate GO1 may be or is used also for limiting the correction range, which is done by means of two further comparators K3 and K4, which on the one hand receive the sensed variables S1, S1', S2, S2' mentioned above but on the other hand also receive constant travel or pressure values, for instance those indicated as S10 and S20 in the diagram of FIG. 2; as a result, whenever sensed variables at the outputs of the comparators K3 and K4 exceed the constant comparison variables, blocking signals are produced, which via the OR gate GO1 likewise block the AND gate G1 and thus prevent further triggering of the feed valve 13. Therefore, if this should be desired, the pressure feeding is then limited to this correction range of S10/S20; naturally, these limits can be freely varied and freely selected.

A brake circuit failure comparator K2 is also provided, which responds whenever a predetermined interval between the delivered signals S1, S1' on the one hand and S2, S2' on the other is exceeded, a situation which always indicates the failure of a brake circuit.

Finally, it may be useful to block pressure feeding if the pressure level in the pressure supply means is inadequate. To this end, a warning switch Sw is provided in the vicinity of the switch 14d, and the output of the warning switch is supplied to the OR gate GO1 and then also blocks the pressure feeding.

In this connection, it should be noted that the logic circuit described in connection with discrete switching stages and components in FIG. 3 may be realized in any arbitrary manner; the illustration and the description of its function therefore serve solely to explain basic functions of the invention and describe specialized functional courses in one possible form of realization. It will be understood that the entire logic circuit, or individual components and blocks thereof, can comprise analog or digital or hybrid elements, all or some of which may also be combined and may include corresponding portions of program-controlled digital systems, such as microprocessors, microcomputers, and the like.

In the diagram of FIG. 2, a typical pedal characteristic of a conventional brake booster is shown in the form of an exemplary curve course I plotted in dot-dash lines; it will be appreciated that a corresponding brake pressure buildup or piston travel occurs only after a predetermined pedal stroke, such as at S10; on the other hand, if the pressure feeding according to the invention is taken into consideration, the elevated curve course II plotted in a solid line is produced, which has a correction zone S10/S20, in which lower pressure range the pressure feeding is advantageously used, until the brake shoes or linings are in full contact with the disks or drums of the associated brake system. From the diagrams of FIG. 2, the brake circuit failure recognition function can also be seen: a curve course characteristic of a circuit failure is shown at III and it will be appreciated that up to a pedal travel or booster pressure variable of S10', virtually no significant brake pressure is generated, so that the comparator K2 of FIG. 3 that detects the interval between the signal values can recognize a corresponding brake circuit failure if the threshold is exceeded.

All the characteristics described above, and shown in the drawing may be essential to the invention, both individually and in combination with one another.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. An apparatus for controlling brake pressure in brake circuits of a vehicle brake booster including a booster piston, a booster pressure chamber (29a) and an associated pedal-actuated brake valve (15) operatively contained within said booster piston for feeding a pressure medium from a pressure medium supply means into said booster pressure chamber, a master brake cylinder (16) and first and second master brake pistons (18, 19), and first and second master piston pressure chambers, the master brake cylinder being connected to the brake circuits (I, II) including wheel brakes, a feed valve (13) connected to said booster pressure chamber and to each of said brake circuits (I, II), at least one pressure transducer means (28', 29') connected to one of said master piston pressure chambers of said booster pressure chamber for producing an output signal (S1, S2'), and at least one travel transducer means (28, 29) operatively connected to said vehicle brake booster for producing an output signal (S1', S2), and an electronic logic circuit means connected to receive each said signal output of each of said at least one pressure transducer means and at least one travel transducer means for generating a feed valve actuating signal by comparing variable signals transferred from said at least one pressure transducer means and said at least one travel transducer means for actuating said feed valve to change a pedal characteristic curve course to another pedal characteristic curve course in accordance with a predetermined correction range beginning preferably immediately after a start of a pedal travel out of a rest position of said pedal by delivering booster pressure emanating from said booster pressure chamber directly into said brake circuits while said first and second master brake pistons are actuated by said pedal actuated hydraulic brake booster.

2. An apparatus as defined by claim 1, characterized in that to detect set-point and actual values in the vicinity of said pedal actuating hydraulic brake booster, at least one pedal travel transducer (28) and at least one master brake cylinder piston travel transducer are provided, in which said variable signals (S1, S1', S2, S2') are delivered to said electronic logic circuit which compares said variable signals and triggers the feed valve according to said compared signals.

3. An apparatus as defined by claim 1, in which said feed valve is a 3/2-way magnetic valve having an outlet which communicates via check valves with connecting pressure lines connected to said brake circuits (I, II) that lead to wheel brake cylinders.

4. An apparatus as defined by claim 2, in which said feed valve is a 3/2-way magnetic valve having an outlet which communicates via check valves with connecting pressure lines connected to said brake circuits (I, II) that lead to wheel brake cylinders.

5. An apparatus as defined by claim 2, in which said electronic logic circuit includes a first comparison means which compares said variable signals, delivered via a characteristic curve shaping block of each of said transducers with one another and triggers said feed valve accordingly at an attained predetermined curve.

6. An apparatus as defined by claim 3, in which said electronic logic circuit includes a first comparison means which compares said variable signals, delivered via a characteristic curve shaping block of each of said transducers with one another and triggers said feed valve accordingly at an attained predetermined curve.

7. An apparatus as defined by claim 4, in which said electronic logic circuit includes, a first comparison means which compares said variable signals, delivered via a characteristic curve shaping block of each of said transducers with one another and triggers said feed valve accordingly at an attained predetermined curve.

8. An apparatus as defined by claim 5, in which an interruption means is incorporated into a signal trigger line leading to the feed valve, said interruption means blocks the triggering of the feed valve whenever predetermined threshold variables limiting the correction range are exceeded and a predetermined trigger time duration is exceeded and the pressure level of said pressure medium supply means is inadequate.

9. An apparatus as defined by claim 6, in which an interruption means is incorporated into a signal trigger line leading to the feed valve, said interruption means blocks the triggering of the feed valve whenever predetermined threshold variables limiting the correction range are exceeded and a predetermined trigger time duration is exceeded and the pressure level of said pressure medium supply means is inadequate.

10. An apparatus as defined by claim 7, in which an interruption means is incorporated into a signal trigger line leading to the feed valve, said interruption means blocks the triggering of the feed valve whenever predetermined threshold variables limiting the correction range are exceeded and/or a predetermined trigger time duration is exceeded and/or the pressure level of said pressure medium supply means is inadequate.

11. An apparatus as defined by claim 8, which said electronic logic circuit includes two further comparators which compare predetermined final correction ranges with the transducer output signals and if they are exceeded block an AND gate incorporated into the output of said first comparator, this blocking being effected via an OR gate.

12. An apparatus as defined by claim 9, in which said electronic logic circuit includes two further comparators which compare predetermined final correction ranges with the transducer output signals and if they are exceeded block an AND gate incorporated into the output of said first comparator, this blocking being effected via an OR gate.

13. An apparatus as defined by claim 10, in which said electronic logic circuit includes two further comparators which compare predetermined final correction ranges with the transducer output signals and if they are exceeded block an AND gate incorporated into the output of said first comparator, this blocking being effected via an OR gate.

14. An apparatus as defined by claim 8, in which a timing element is provided, which if a predetermined triggering duration of the feed valve is exceeded sets an error memory, an end of line output of which is connected to an OR gate that effects the blocking of said feed valve and triggers a warning light.

15. An apparatus as defined by claim 8, which includes a further comparator that compares said variable signals with one another which if a predetermined interval between said variables signals is exceeded triggers a warning lamp for the purpose of brake circuit failure recognition.

16. An apparatus as defined by claim 2, which includes at least one characteristic curve correction circuit block, which is triggered by one of said variable signals and generates an output variable that takes a predetermined characteristic curve course and delivers it to a main comparator for comparison with other said variable signals.

17. A method for correcting a brake pedal characteristic for controlling pressure in vehicle systems in which a pressure medium is delivered via a brake pedal-actuated brake valve which is integrated into a brake booster piston of a hydraulic brake booster to produce booster pressure in a brake booster pressure chamber containing said brake booster piston to supply a force to at least one master brake piston movable in a master brake cylinder substantially in synchronism with said pedal-actuated brake valve and which acts directly on wheel brake cylinders via at least one brake circuit (I, II), comprising the steps of:

- detecting the travel of said brake pedal, and generating a travel dependent signal (S1′) in accordance with the travel of said brake pedal,
- directing said travel dependent signal (S1′) to an electronic logic circuit,
- detecting a pressure generated by said at least one master brake piston by actuating the brake-pedal actuatable brake valve, and generating a pressure dependent signal (S2′) in accordance with the pressure generated by said at least one master brake piston,
- directing said pressure dependent signal (S2′) to said electronic circuit,
- ascertaining a difference signal by comparing said travel dependent signal (S1′) and said pressure dependent signal (S2′) in said electronic logic circuit, directing said difference signal to a feed valve, using said difference signal as a trigger signal for opening said feed valve to supply fluid under pressure from a connection of said brake booster pressure chamber to a connection with said at least one brake circuit (I, II) to permit fluid flow from said booster chamber to said at least one brake circuit, which reduces existing differences between the travel dependent signal (S1′) and the pressure dependent signal (S2′), and
- interrupting said trigger signal when said travel dependent signal (S1′) and said pressure dependent signal (S2′) exceeds a predetermined initial range.

18. A method as defined by claim 17, which comprises sensing the travel of the brake pedal directly at the brake pedal.

* * * * *

UNITED STATES PATENT AND TRADEMARK OFFICE
CERTIFICATE OF CORRECTION

PATENT NO.   : 4,919,493
DATED        : April 24, 1990
INVENTOR(S)  : Heinz Leiber It is certified that error appears in the above-identified patent and that said Letters Patent is hereby corrected as shown below:

Title page, add the Assignee:

[73] Assignee: Robert Bosch GmbH
               Stuttgart, Fed. Rep. of Germany

Signed and Sealed this

Twentieth Day of August, 1991

Attest:

HARRY F. MANBECK, JR.

*Attesting Officer*   *Commissioner of Patents and Trademarks*